US011580726B2

(12) United States Patent
Gersberg

(10) Patent No.: US 11,580,726 B2
(45) Date of Patent: Feb. 14, 2023

(54) METHOD OF ACQUISITION AND INTERPRETATION OF IMAGES USED FOR COMMERCE ITEMS

(71) Applicant: Eduardo Gersberg, Chatou (FR)

(72) Inventor: Eduardo Gersberg, Chatou (FR)

(\*) Notice: Subject to any disclaimer, the term of this patent is extended or adjusted under 35 U.S.C. 154(b) by 51 days.

(21) Appl. No.: 17/129,037

(22) Filed: Dec. 21, 2020

(65) Prior Publication Data

US 2022/0121849 A1  Apr. 21, 2022

(51) Int. Cl.
*G06V 20/10* (2022.01)

(52) U.S. Cl.
CPC .................... *G06V 20/10* (2022.01)

(58) Field of Classification Search
CPC ......... G06V 20/10; G06V 20/52; G06V 10/19
See application file for complete search history.

(56) References Cited

U.S. PATENT DOCUMENTS

2017/0109604 A1\*  4/2017  Graham ........... H04N 5/232945
2020/0302510 A1\*  9/2020  Chachek ............... H04W 4/021

FOREIGN PATENT DOCUMENTS

CN           108647671 A   \* 10/2018
CN           109389341 A   \*  2/2019

\* cited by examiner

*Primary Examiner* — Matthew C Bella
*Assistant Examiner* — Kathleen M Broughton
(74) *Attorney, Agent, or Firm* — Defillo & Associates, Inc; Evelyn A. Defillo

(57) ABSTRACT

Image acquisition and interpretation method used for articles of commerce, consisting of one or more gondolas or shelves (A) in which shelves (X) are installed, to which are added four repair marks (B, E) that, in combination with a mobile device with a photographic camera (D), will take and process images in an automated way thanks to areas designed for this purpose (C) where reference marks (F, G) are displayed, correcting the perspective deformation and cutting the image to the area delimited by the repair marks, to then send the processed images to a computer server that can index data such as quantity and details of articles, number of units of each, physical characteristics, prices, etc.

3 Claims, 1 Drawing Sheet

METHOD OF ACQUISITION AND INTERPRETATION OF IMAGES USED FOR COMMERCE ITEMS

FIELD OF THE INVENTION

The present disclosure is aimed to register a method of acquisition and interpretation of images used for articles of commerce, which incorporates remarkable innovations and advantages in terms of the agility of handling stocks, management of warehouses and shops, and weight calculation or economic inventories, among other applications.

BACKGROUND

Markets are created as humans go from being nomadic to sedentary. At the moment in which the human being begins to have storage capacity and, as a result of specialization, new needs arise for some people, covered with surpluses from others. With the development of the towns, markets have evolved to meet needs of all kinds and have developed to become, at present, one of the most important economic activities for the development of a society.

Given the circumstances of prominence and the economic engine of an increasingly competitive society, markets, today transformed into commercial areas of the largest possible size to supply all the needs of the inhabitants of an area, have an increasingly reduced economic margin where its management must be adjusted to the maximum. Feasibility studies, constant remodeling to adapt to the constant changes in trends of its consumers, advertising by all available means and a long etcetera make the management of these surfaces increasingly complex and review more variables.

One factor to take into account is stock control. The planning of supplies, the financial calculation and use of spaces is part of that matter.

The invention disclosed herein contributes significantly to improving such management.

DETAILED DESCRIPTION

The method of acquisition and interpretation of images used for articles of commerce is a set of elements by means of which it is possible to find out in real time which articles are placed on an exhibition or storage surface, how many, all their characteristics—as they may be the weight, volume or total amount-, and any related data in an instantaneous and automatic way.

The system is based on the taking of images by means of a mobile device, with several reference points distributed evenly throughout the entire exhibition area, or storage surface, their processing on the smartphone itself in order to correct deformations and eliminate elements outside the delimited area—adaptation by cutting and parallelizing the image-, and sending them wirelessly to a computer station where these images can be processed by means of a specifically developed software, which recognizes all the products in the image and the quantity of them.

The software itself performs calculations on all the characteristics of the photographed set, once the perspective deformation has been corrected and the image cropped to predetermined limits. Among these characteristics, apart from the number of units available, the linear and square meters that each product occupies and its percentage of the total exposed are particularly useful. It would also be immediate the calculation of the total economic amount to manage the cash flow of the business with more information or, even, in the face of an inventory for insurance companies.

DETAILED DESCRIPTION OF THE INVENTION

System device to process images related to articles placed on shelves of commercial surfaces, through taking automatically such images by means of a mobile device that corrects the perspective deformation and appropriately cuts the image for its subsequent sending to a computer server where the data referring to characteristics related to the product are indexed.

Figure 1:
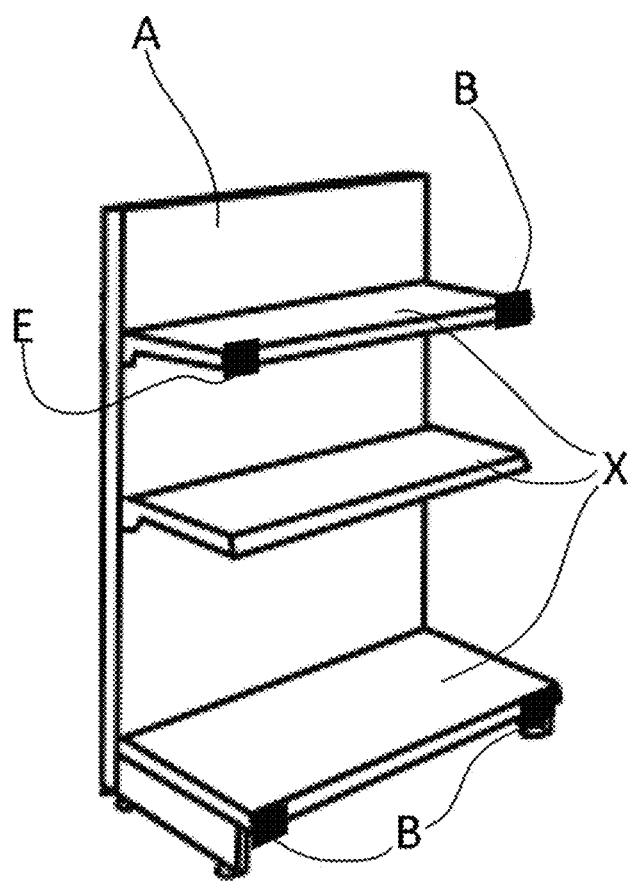
FIG. 1 shoes perspective front view of the device according to the present invention.
Figure 2:
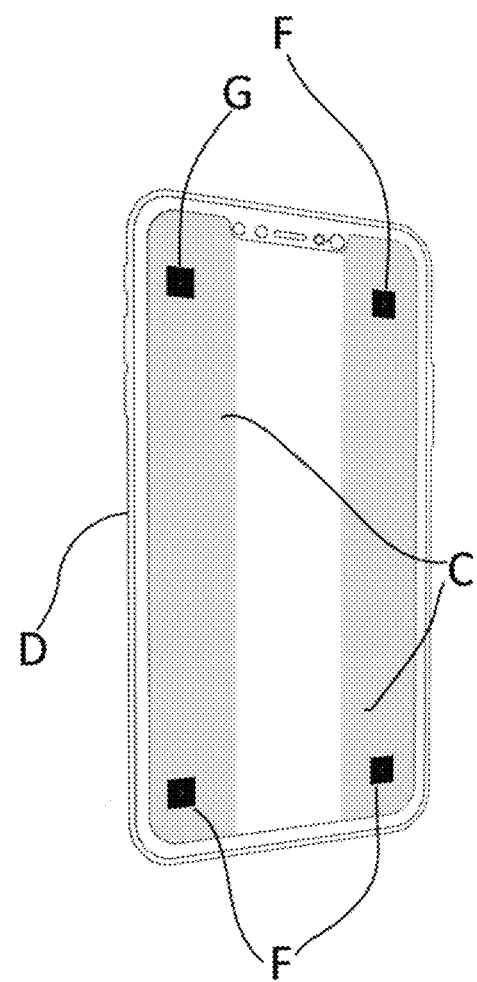
FIG. 2 shows a back view of the device of FIG. 1.

The novel features that are considered characteristic of the invention are detailed in the appended claims. However, the invention itself, as well as the description of the preferred embodiment, will be better understood by taking as reference the accompanying drawings where:

FIG. 1 includes a representation of the set in which:
A is a gondola or shelf
B are the parallelism repair marks
C are the sensitive areas in the smartphone image
D is a smartphone with a camera
E is the mark for repairing parallelism with information on the gondola or shelf
F and G are the repair marks or parallelism displayed in an image on the smartphone screen.
X are the shelves placed on the gondola (A)

DESCRIPTION OF A PREFERRED EMBODIMENT

In view of the figures and explanations provided, a preferred but non-limiting embodiment of the invention can be seen, which consists of a method of acquisition and interpretation of images used for articles of commerce.

First of all, we will start from a standardized commercial shelf, also known as a gondola (A), which has several shelves (X) installed. At the corners of the lower and upper shelves there are four graphic reference marks, or parallelism repair marks (B, E), at the rate of one graphic mark for each corner. In its upper right, lower right and lower left corner there are three identical graphic marks (B), which will later be interpreted by the software developed on the smartphone (D). In its upper left corner there is a new parallel repair graphic mark (E) that contains, in addition to the positional reference, information about the shelf itself, such as a reference number within the store where the gondola is located.

Second, an operator will use a device to capture an image of the whole assembly of the supermarket gondola (A). As indicated in the previous paragraph, software has been developed that is installed on a mobile phone or smartphone (D) and that, among other things, controls its camera.

The smartphone application has shaded areas on both sides of the screen, called sensitive areas (C). At the moment when the four marks of repair or parallelism of the image to be taken (F, G) are within the sensitive areas of the image (C), following a specific pattern—each mark in an area close to each corner of the smartphone screen—the device will automatically take a picture of the whole. Until the aforementioned circumstance is known, the smartphone will continue to display the camera image on its screen without taking any pictures.

Once the photograph is taken, the image recognition software itself developed and installed on the smartphone processes the same in order to correct the deformation caused by the perspective with which it is taken and eliminate elements other than those to be indexed—other attached items that are not part of that group of the gondola, a lamp, a pallet, etc. So, with the help of the four repair marks or parallelism collected in the image itself (F, G), the software adapts the distorted image to the perspective of a real image and cuts it to an area delimited by an imaginary rectangle where the four previous repair marks are its vertices. This is one of the most relevant features of the application, its automation when it comes to taking, correcting and cropping an image.

Once the image is adapted, it is sent wirelessly to a remote server that has in its database an image bank of all the items sold that will be compared with the items photographed. Once the match is found, the software will also count the number of units placed and will add and calculate all the characteristics and data that have been incorporated into the database. The indexed information will be included in a data file.

The invention claimed is:

1. An image acquisition and interpretation device for articles of commerce comprising:
    a gondola (A) including a first upper corner, a second upper corner, a first lower corner, a second lower corner, and shelves (X),
    a first graphic mark placed on the first upper corner,
    a second graphic mark placed on the first lower corner,
    a third graphic mark placed on the second lower corner,
    a repair graphic mark placed on the second upper corner, the repair graphic mark contains positional reference information and information about the shelf and the articles on the shelf,
    a mobile phone or smartphone with a screen, a camera (D), and a phone application including an imagen recognition software to control the camera, the phone application creates sensitive shade areas on both sides of the screen,
    wherein only when the first graphic mark, the second graphic mark, the third graphic mark, and the repair graphic mark are within the sensitive, shade areas of the screen, then the camera automatically takes an image of the entire gondola;
    wherein the imagen recognition software processes the image to adapt the image to a perspective of a real image and cuts the image into an area delimited by an imaginary rectangle where the first graphic mark, the second graphic mark, the third graphic mark, and the repair graphic mark are vertices of the vertices of the rectangle;
    wherein the software compares the articles present in the cut image with the images on an image bank to find a match, counts the number of articles on the gondola, calculates linear and square meters of each article on the gondola and space available on the gondola.

2. An image acquisition and interpretation method used for the articles of commerce comprising the steps of:
    obtaining from client a gondola (A) including a first upper corner, a second upper corner, a first lower corner, a second lower corner, and shelves (X);
    placing a first graphic mark on the first upper corner of the gondola;
    placing a second graphic mark on the first lower corner of the gondola;
    placing a third graphic mark on the second lower corner;
    placing a repair graphic mark on the second upper corner, the repair graphic mark contains positional reference information and information about the shelf and the articles on the shelf;
    providing a mobile phone or smartphone with a screen, a camera (D), and a phone application including an imagen recognition software to control the camera, the phone application creates sensitive shade areas on both sides of the screen;
    aligning the first graphic mark, the second graphic mark, the third graphic mark, and the parallel repair graphic mark with the sensitive shade areas of the screen of the mobile phone to automatically take an image of the entire gondola;
    processing the image by the imagen recognition software;
    adapting the image to a perspective of a real image;
    cutting the image into an area delimited by an imaginary rectangle where the first graphic mark, the second graphic mark, the third graphic mark, and the repair graphic mark are vertices of the vertices of the rectangle, and
    sending the cut image to a remote server having a database with an image bank of all articles sold;
    comparing the articles present in the cut image with the images on the image bank to find a match,
    counting the number of articles on the gondola;
    calculating linear and square meters of each article on the gondola and space available on the gondola.

3. The image acquisition and interpretation method used for articles of commerce according to claim 2, wherein the adaptation includes sending the images taken to a computer server that will process them in a fully automated manner.

* * * * *